United States Patent [19]

Bauernfeind

[11] Patent Number: 4,759,967

[45] Date of Patent: Jul. 26, 1988

[54] EMBOSSING PROCESS AND PRODUCT

[75] Inventor: Robert N. Bauernfeind, Brookfield, Conn.

[73] Assignee: Kimberly-Clark Corporation, Neenah, Wis.

[21] Appl. No.: 574,646

[22] Filed: Jan. 30, 1984

Related U.S. Application Data

[63] Continuation-in-part of Ser. No. 451,124, Dec. 20, 1982, abandoned.

[51] Int. Cl.[4] .......................... B32B 3/28; B32B 29/00

[52] U.S. Cl. .................................... 428/154; 428/153; 428/156; 428/172; D5/53

[58] Field of Search ............... 428/156, 172, 154, 153; D6/595; D5/37, 53

[56] References Cited

U.S. PATENT DOCUMENTS

| | | | |
|---|---|---|---|
| D. 217,071 | 3/1970 | Volo | D6/266 |
| D. 262,747 | 1/1982 | Erickson | D59/2 B |
| 3,519,528 | 7/1970 | Fourness | 428/153 |
| 3,673,060 | 6/1972 | Murphy et al. | 428/172 |
| 3,708,366 | 1/1973 | Donnelly | 428/154 |

*Primary Examiner*—Paul J. Thibodeau
*Attorney, Agent, or Firm*—Gregory E. Croft; Donald L. Traut; Jeremiah J. Duggan

[57] ABSTRACT

Cross-machine strength reduction of creped wadding sheets due to embossing is reduced by a background embossing pattern having elongated embossments oriented with the major axis of the embossments substantially parallel to the cross-machine direction of the sheet.

10 Claims, 2 Drawing Sheets

EMBOSSING PROCESS AND PRODUCT

This application is a continuation-in-part of application Ser. No. 451,124, filed Dec. 20, 1982 now abandoned.

BACKGROUND OF THE INVENTION

1. Field of the Invention

This invention relates to the manufacture of paper towels and the like. More particularly, it relates to methods of embossing paper sheets.

2. Brief Description of the Prior Art

It is well known in the papermaking industry that embossing a paper web or sheet gives the sheet bulk, a property that is of particular importance in manufacturing paper towels because it is associated with softness and absorbency by the consumer. Bulk is not only important with regard to the feel of the individual sheets, but also in regard to the bulkiness of the packaged product. In the case of paper towels, where the product is packaged in rolls it is desirable to minimize nesting of the sheets within one another in order to maintain a larger roll diameter with a given number of sheets per roll.

In manufacturing multi-ply paper sheets, there are basically two processes which are well known in the art. One is a nested process and the other is a pillowed process. The nested process is illustrated in U.S. Pat. No. 3,694,300 to Small and U.S. Pat. No. 3,867,225 to Nystrand and generally involves the separate embossing of two plies between a rubber roll and a steel embossing roll, applying an adhesive with a roller to the protruding embossments of one of the plies, and combining the two plies together such that the protrusions of one sheet are attached within the depressions of the other. The pillowed process is similar and is illustrated by U.S. Pat. No. 3,961,119 to Thomas. In this process, however, the plies are laminated together such that the protrusions of one ply are not aligned within the depressions of the other.

The use of embossed designs to improve the aesthetic appeal of the product is also known in the art, as illustrated by U.S. D. No. 262,747 to Erickson which shows a shamrock design.

Regardless of the method used to emboss sheets, however, it is known that the embossing process causes a reduction in strength of the sheet due to breakage of inter fiber bonds. Because the tensile strength in the cross-machine direction (CD) of creped wadding sheets is lower than the machine direction (MD) tensile strength, CD strength is the limiting factor insofar as the overall strength of the sheet is concerned. As a result, CD strength reduction is a critical factor in the embossing process. Therefore there is a need for an embossing process which reduces the strength degradation, particularly in the CD of the sheet.

SUMMARY OF THE INVENTION

In general, the invention resides in an embossed paper sheet particularly suitable for use as bath tissues and paper towels, and a method for making same, wherein a majority, and preferably substantially all, of the background embossments (deflected areas corresponding to the embossing elements on the embossing rolls) have a major and minor axis and wherein the major axis is substantially aligned in the CD of the sheet. Suitable embossment shapes include ovals, diamonds, rectangles, etc. as well as unsymetrical or irregular shapes. It has been discovered that substantially aligning the major axis of the embossments in the CD of the sheets reduces CD strength degradation caused by the embossing. For purposes herein, "substantial" alignment in the CD means within about 20° of the CD. A lesser degree of alignment is believed to have relatively minimal benefits. Preferably the major axis is aligned within about 10° of the CD, and most preferably parallel to it. "Substantially all of the background embossments" means at least 80 percent of the embossments of the background embossing pattern. The "background embossing pattern" is a pattern which essentially covers the sheet. As used herein, the background embossing pattern can be the only pattern present on the sheet, as opposed to some embossing patterns which consist of a background pattern and an additional intermittent design pattern. The meaning of "background embossing pattern" and "design pattern" will become more clear with reference to FIG. 3.

DETAILED DESCRIPTION OF THE DRAWING

Figure 1:
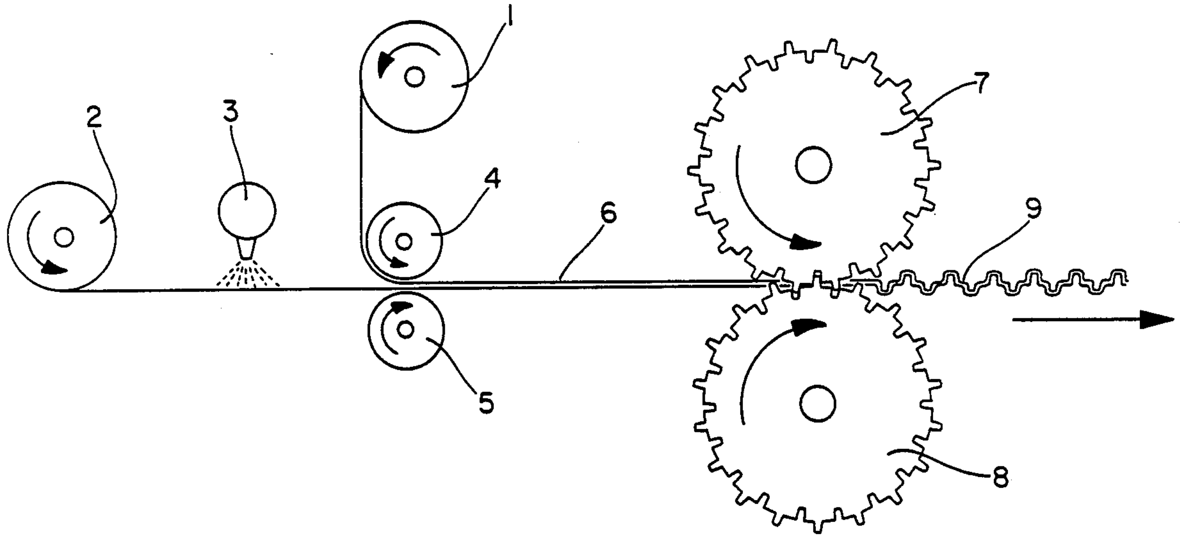
FIG. 1 is a schematic view of an embossing process in accordance with this invention.

Directing attention to the Drawing, the invention will be described in more detail. FIG. 1 is a schematic view illustrating an example of how paper sheets of this invention can be produced using matched steel embossing rolls. This specific example illustrates the production of a two-ply towel, but any number of plies can be used, such as single ply or triple ply. Separate rolls 1 and 2 feed webs to be attached between nip rolls 4 and 5. At least one of the webs is provided with an adhesive, preferably in the form of a spray 3, as shown. In the nip the two webs are bonded together to form a preattached sheet 6. Although not shown, the preattached sheet 6 can be wound up on a hardroll to be subsequently used as a feed roll for the embossing step to permit flexibility due to varying production speeds. The preattached sheet is then directed between matched steel embossing rolls 7 and 8 wherein the desired embossing pattern is imparted to the preattached sheet resulting in the embossed sheet 9. It will be appreciated that the manner in which the preattached sheet is formed is not to be considered as limiting the scope of the invention. For example, a multi-ply sheet can be formed by folding a single web and cutting off the fold to produce a two-ply sheet, rather than supplying each ply from a separate roll as shown in FIG. 1. In addition, a multi-ply sheet containing more than two plies can also be embossed in accordance with this invention, as long as the plies are sufficiently bonded together, either mechanically or with adhesive, to maintain the integrity of the sheets through the embossing process. This is necessary because the embossing process does not provide sufficient ply attachment, it being an object of the process not to damage the sheet by punching the embossing elements through the sheet which, if it occurred, would provide some degree of ply attachment in and of itself.

Figure 2:
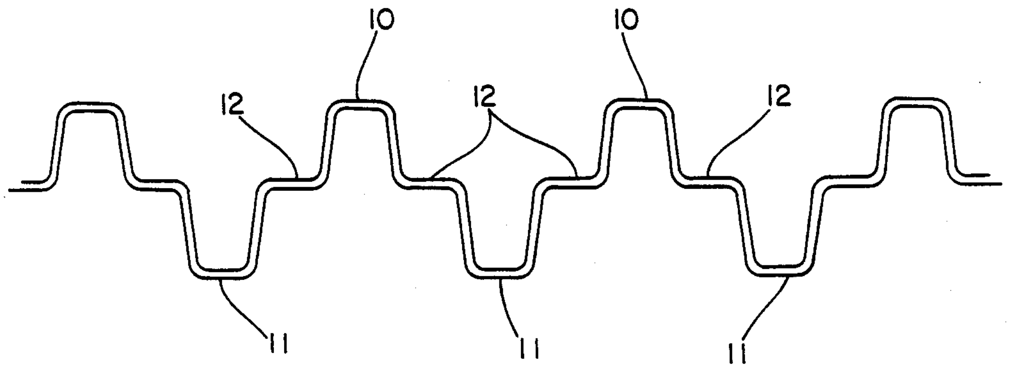
FIG. 2 is a cross-sectional representation of the profile of a two-ply web produced by matched steel embossing.

FIG. 2 illustrates a cross-section of a portion of the embossed sheet 9 of FIG. 1. Shown are the protruding deflected zones 10, the depressed deflected zones 11, and the substantially undeflected neutral plane 12 of the 2-ply sheet. In a preferred embodiment, the height of the protrusions 10 and the depth of the depressions 11 is about 0.016 inch. The deflected zones, when viewed from the top or bottom of the sheet, are oval in shape and have a length (major axis) of about 0.075 inch and a width (minor axis) of about 0.035 inch. The width of the neutral plane 12, i.e. the distance between deflected zones 10 and 11, is about 0.035 inch or greater. It is preferred that the spacing of the deflected zones be at least as great as the dimension of the minor axis. It will be appreciated that the precise spacing and shape of the deflected areas can vary depending upon the strength and aesthetic requirements of the sheet. Also shown by FIG. 2 is the corresponding relationship between the protrusions and depressions on one side of the sheet relative to the depressions and protrusions on the other side of the sheet.

Figure 3:
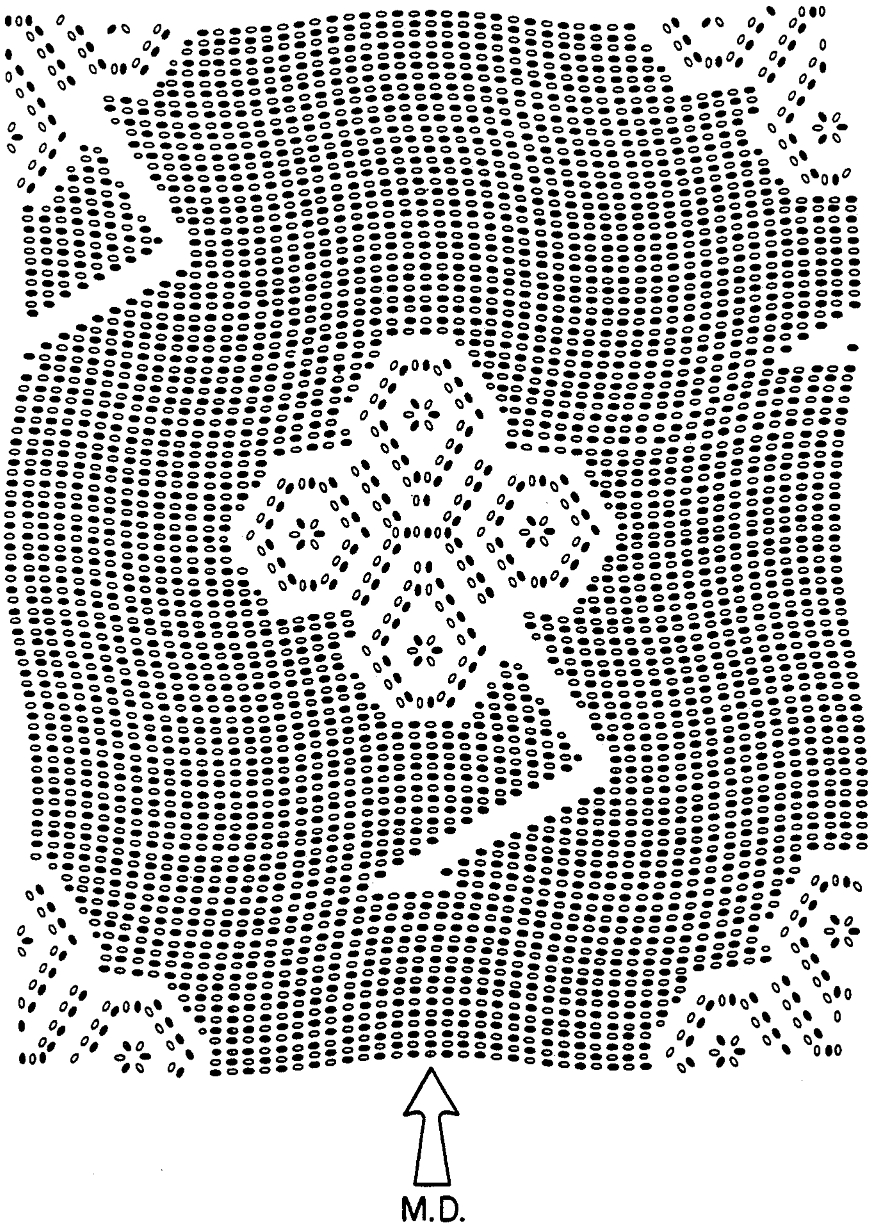
FIG. 3 is a plan view of a paper sheet in accordance with this invention, illustrating alignment of the major axis of all of the oval background embossments in the cross-machine direction of the sheet.

FIG. 3 is a plan view of an embossed sheet made in accordance with FIGS. 1 and 2 illustrating a background embossing pattern and an intermittent shamrock design pattern. The black ovals represent protruding deflected zones and the white ovals represent depressed deflected zones. The white background area represents the substantially undeflected neutral plane. As shown, the oval-shaped deflected zones are arranged to form a background embossing pattern comprising successive curvilinear rows of alternately protruding and depressed deflected zones spaced apart by the neutral plane and which substantially cover the entire sheet. The background embossing pattern need not be curvilinear, but such a pattern is advantageous in that it approximates a random pattern and reduces the tendency of the sheets to nest when wound up into rolls. As shown, the major axis of the ovals in the background embossing pattern is parallel to the cross-machine direction of the creped web or sheet. This orientation has been found to decrease the cross-machine direction strength degradation due to embossing.

In addition, the intermittent shamrock design pattern also reduces the nesting tendency. As previously mentioned, reduced nesting improves the bulky feel of the rolled product. As shown, the shamrock design pattern is essentially an intermittent pattern containing oval-shaped protruding and depressed areas having their major axis aligned in a direction different from that of the ovals in the background embossing pattern. This arrangement further aids in retarding nesting.

EXAMPLES

Example 1: Producing a Two-Ply Embossed Towel

In making a two-ply embossed towel in accordance with this invention, two softrolls containing suitable single-ply webs were produced on a paper machine using typical paper industry equipment and practices. The softrolls were unwound and the two single-ply base sheets, each having a basis weight of about 14 pounds per 2880 square feet, were plied together by spraying a polyvinyl acetate adhesive between them and passing them between press rolls having a loading of about 20–40 pounds per linear inch. The polyvinyl acetate adhesives had a solids content of about 15–30 weight percent. Typically, about 7–15 lbs. of adhesive solids per ton of base sheet are used for a base sheet having a basis weight of 10–14 lbs./2880 $ft.^2$ per ply. The resulting two-ply sheet was rewound into a hardroll at speeds of about 2500–4500 feet per minute.

The two-ply hardrolls were converted into a finished product using standard paper towel converting equipment, excepting the embossing rolls. The two-ply sheet was unwound and passed between matched-steel embossing rolls at speeds of about 1300–1800 feet per minute. The embossing rolls had a diameter of about 14–16 inches and a width of about 99 inches. The embossing rolls were mated in the same position in which they were matched-steel engraved and were of the design shown in FIG. 3. The embossing rolls were set at about 0.007–0.020 inches off bottom clearance and adjusted for no steel-to-steel contact. Ply attachment of the final product therefore resulted from the adhesive rather than the embossing.

The dimensions of the oval embossing pattern elements were as follows: major axis of oval (0.070 inch); minor axis of oval (0.035 inch); MD element-to-element spacing (0.065 inch); CD element-to-element spacing (0.048 inch); and element depth (0.050 inch). These dimensions can vary about ±10 percent across the pattern.

The embossed sheet was then passed through a printing operation, perforated, and wound into finished logs having the desired sheet count. The logs were then cut into segments of the desired width and wrapped.

Strength degradation due to embossing for this product was 35% as compared to about 55% degradation for the identical pattern having the long axis of the background elements parallel to the MD direction of the sheet.

Example 2: Strength Degradation As A Function of Embossing Element Orientation Additional comparisons of the CD strength degradation effects of the embossing element orientation were made to further illustrate this invention. Specifically, seven different background embossing patterns (Samples 1-7) on seven different embossing roll pairs were used to emboss samples of bath tissue and paper toweling creped wadding. In order to test the different patterns, a large number of test sheets were used for each sample and the results were averaged to give representative data for each. Specifically, 200 sheets of paper towel creped wadding (approximately 26 lb./2880 $ft.^2$ basis weight) and about 200 sheets of bath tissue creped wadding (approximately 21 lb./2880 $ft.^2$ basis weight) were cut from hard rolls of each type of wadding. A stack of 20 sheets was randomly selected for each of the seven embossing patterns to be tested. Ten of the twenty sheets were fed through the embossing nip with the MD of the sheets oriented in the machine direction of the embossing rolls (MD embossed). The other ten sheets were rotated 90° and fed through the embossing nip with the CD of the sheets oriented in the machine direction of the embossing rolls (CD embossed). The embossing level was set to produce embossed sheets without producing holes.

Embossing roll pair #1 consisted of a pair of matched steel embossing rolls having a random diamond pattern consisting of curvilinear rows of diamond-shaped embossments. The diamonds had a length (major axis) of about 0.118 inch and a width (minor axis) of about 0.093 inch. The major axis of each diamond was aligned parallel to the MD of the embossing rolls. The individual diamonds were spaced apart by about 0.025 inch and had a pattern density of about 70 diamonds per square inch. Embossing roll pair #2 consisted of a pair of matched steel embossing rolls having a CD-oriented random oval pattern consisting of curvilinear rows oval-shaped embossments as described in Example 1. The major axis of each oval was aligned in the CD direction of the embossing rolls (parallel to the axis of the rolls). Embossing roll pair #3 consisted of a pair of matched steel embossing rolls having an English oval pattern consisting of linear rows of oval-shaped embossments. The ovals had a length of about 0.089 inch and a width of about 0.047 inch and were oriented with the major axis aligned in the MD direction of the embossing rolls. The ovals were spaced apart by about 0.031 inch at the point of closest spacing and had a pattern density of about 105 ovals per square inch. Embossing roll pair #4 consisted of a pair of matched steel embossing rolls having an MD-oriented random oval pattern identical to the pattern of pair #2, except the major axis of each element was oriented parallel to the MD of the embossing rolls. Embossing roll pair #5 consisted of a pair of matched steel embossing rolls having a reduced density random oval pattern consisting of curvilinear rows of oval-shaped embossments having the major axis of each oval aligned parallel to the MD of the embossing rolls. The ovals had a length of about 0.102 inch and a width of about 0.079 inch. There were about 103 ovals per square inch. Embossing roll pair #6 consisted of a steel roll and a rubber roll, the steel roll having an embossing pattern equivalent to that of pair #2. Embossing roll pair #7 consisted of a steel roll and a rubber roll, the steel roll having an embossing pattern equivalent to that of pair #4. The following table summarizes the data:

TABLE I

Effect of Embossing Element Orientation on Cross-Machine Direction Strength

| Embossing Roll Pair | Pattern | Material Tested | % CD Strength Reduction (MD Embossed) | % CD Strength Reduction (CD Embossed) | Net Improvement (Percent CD Strength Reduction) |
|---|---|---|---|---|---|
| 1 | Random Diamond | Bath Tissue | 19 | 3 | 16 |
| | (Matched Steel) | Paper Towel | 30 | 15 | 15 |
| 2 | CD-Oriented | Bath Tissue | 14 | 23 | 9 |
| | Random Oval | Paper Towel | 27 | 35 | 8 |
| | (Matched Steel) | | | | |
| 3 | English Oval | Bath Tissue | 29 | 12 | 17 |
| | (Matched Steel) | Paper Towel | 40 | 18 | 22 |
| 4 | MD-Oriented | Bath Tissue | 33 | 20 | 13 |
| | Random Oval | Paper Towel | 43 | 25 | 18 |
| | (Matched Steel) | | | | |
| 5 | Reduced Density | Bath Tissue | 27 | 10 | 7 |
| | Random Oval | Paper Towel | 37 | 16 | 21 |
| | (Matched Steel) | | | | |
| 6 | CD-Oriented | Bath Tissue | 41 | 49 | 8 |
| | Random Oval | Paper Towel | 38 | 56 | 18 |
| | (Rubber/Steel) | | | | |
| 7 | MD-Oriented | Bath Tissue | 76 | 67 | 9 |
| | Random Oval | Paper Towel | 61 | 48 | 13 |
| | (Rubber/Steel) | | | | |

The results shown in Table I illustrate the reduced CD strength degradation achieved by the embossing pattern of this invention. The net improvement in CD strength degradation obtained with the pattern of this invention is set forth in the last column of the Table. The improvement was measurable for all seven samples regardless of: (1) the shape of the particular background pattern elements (diamond vs. oval); (2) the materials of the embossing rolls (matched steel vs. rubber/steel); (3) the basis weight of the creped wadding (tissue vs. towels); (4) the density of the background embossing pattern (random oval vs. reduced random oval); or (5) the orientation of the creped wadding relative to the embossing nip (Sample 2 vs. Sample 4 and Sample 6 vs. Sample 7). The improvement in strength reduction was, however, dependent upon the orientation of the background embossing elements relative to the orientation of the creped wadding, i.e. the major axis of the background embossing elements must be substantially aligned parallel to the cross-machine direction of the wadding or sheet.

It will be appreciated that the specific designs shown for purposes of illustration are not to be construed as limiting the scope of this invention as defined by the following claims.

I claim:

1. A paper towel or tissue product having a background embossing pattern comprising embossments spaced apart by substantially undeflected neutral planes wherein the embossments of the background embossing pattern have a major and minor axis and wherein the major axis of a majority of the embossments of the background embossing pattern is substantially aligned in the cross-machine direction of the product, whereby the cross-machine direction tensile strength of said product is greater than an otherwise identical product having the major axis of the embossments of its background embossing pattern aligned parallel to its machine direction.

2. The paper sheet of claim 1 wherein the major axis of substantially all of the embossments of the background embossing pattern is substantially aligned in the cross-machine direction of the sheet.

3. The paper sheet of claim 1 wherein the embossments of the background emnbossing pattern are oval, rectangular, or diamond-shaped.

4. The paper sheet of claim 1 wherein the major axis of the embossments of the background embossing pattern is parallel to the cross-machine direction of the sheet.

5. The paper sheet of claim 4 wherein the spacing of the embossments of the background embossing pattern is at least as great as the minor axis dimension.

6. The paper sheet of claim 5 wherein the embossments of the background embossing pattern are oval in shape.

7. The paper sheet of claim 6 wherein the length of the major axis of the oval embossments is about 0.075 inch, the length of the minor axis of the oval embossments is about 0.035 inch, and the spacing between adjacent oval embossments is about 0.035 inch.

8. A two-ply paper towel having first and second sides and having a background embossing pattern thereon, said background embossing pattern comprising successive curvilinear rows of alternately protruding and depressed oval-shaped embossments oriented with the major axis of each oval aligned in the cross-machine direction of the towel and spaced apart by a substantially undeflected neutral plane wherein the depressed and protruding embossments of the first side correspond to the protruding and depressed embossments, respectively, of said second side.

9. The paper towel of claim 8 wherein the background embossing pattern is intermittently interrupted by a design pattern containing oval-shaped protruding and depressed embossments having the major axis of the ovals aligned in a direction different than that of the ovals in the background embossing pattern.

10. The paper towel of claim 9 wherein the design pattern is a shamrock.

* * * * *